(12) United States Patent
Lee et al.

(10) Patent No.: US 11,739,463 B2
(45) Date of Patent: Aug. 29, 2023

(54) METHOD OF USING IMAGE RECOGNITION PROCESSES FOR IMPROVED OPERATION OF A LAUNDRY APPLIANCE

(71) Applicant: Haier US Appliance Solutions, Inc., Wilmington, DE (US)

(72) Inventors: Hoyoung Lee, Seoul (KR); Khalid Jamal Mashal, Louisville, KY (US); Je Kwon Yoon, Seongnam Gyeonggi (KR); JaeHyo Lee, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 296 days.

(21) Appl. No.: 17/088,707

(22) Filed: Nov. 4, 2020

(65) Prior Publication Data
US 2022/0136162 A1    May 5, 2022

(51) Int. Cl.
*D06F 34/22*   (2020.01)
*D06F 33/37*   (2020.01)
*D06F 33/47*   (2020.01)
*G06T 7/00*    (2017.01)
*D06F 103/20*  (2020.01)
*D06F 105/10*  (2020.01)
(Continued)

(52) U.S. Cl.
CPC .............. *D06F 34/22* (2020.02); *D06F 33/37* (2020.02); *D06F 33/47* (2020.02); *D06F 2103/20* (2020.02); *D06F 2105/02* (2020.02); *D06F 2105/10* (2020.02); *D06F 2105/42* (2020.02); *G06T 7/0002* (2013.01); *G06T 2207/20081* (2013.01); *G06T 2207/20084* (2013.01)

(58) Field of Classification Search
CPC ........... D06F 34/22; D06F 33/37; D06F 33/47
See application file for complete search history.

(56) References Cited

U.S. PATENT DOCUMENTS

| | | | | |
|---|---|---|---|---|
| 5,129,241 | A * | 7/1992 | Kiuchi | ................... D06F 34/22 68/12.02 |
| 2014/0326067 | A1* | 11/2014 | Chanda | ................... D06F 33/34 73/32 R |
| 2020/0071871 | A1* | 3/2020 | Kim | ...................... G06T 7/0004 |

FOREIGN PATENT DOCUMENTS

| | | | |
|---|---|---|---|
| CN | 103334265 | A | 10/2013 |
| CN | 106930055 | A | 7/2017 |

(Continued)

OTHER PUBLICATIONS

Machine translation of EP2985381B1, dated Mar. 2017. (Year: 2017).*

*Primary Examiner* — Michael E Barr
*Assistant Examiner* — Kevin G Lee
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A camera assembly is mounted within the wash tub for taking images of the load of clothes during and/or after a wash or rinse cycle. A controller is operably coupled to the camera for obtaining and analyzing the images using a neural network image recognition process (such as an R-CNN process) to determine a whether the level of suds or bubbles exceeds a suds threshold. If there are too many suds in the wash tub, the controller may implement corrective action, e.g., by decreasing a water temperature, adding more water, or reducing the amount of detergent that is auto-dispensed in a subsequent wash cycle.

19 Claims, 6 Drawing Sheets

(51) Int. Cl.
*D06F 105/02* (2020.01)
*D06F 105/42* (2020.01)

(56) References Cited

FOREIGN PATENT DOCUMENTS

| | | | |
|---|---|---|---|
| EP | 2985381 | B1 | 3/2017 |
| JP | 2013090736 | A * | 5/2013 |
| KR | 101989177 | B1 | 9/2019 |

\* cited by examiner

METHOD OF USING IMAGE RECOGNITION PROCESSES FOR IMPROVED OPERATION OF A LAUNDRY APPLIANCE

FIELD OF THE INVENTION

The Present Subject Matter Relates Generally to Washing Machine Appliances, or More Specifically, to Systems and Methods for Using Image Recognition Processes to Improve or Optimize Operation of Washing Machine Appliances

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Notably, if the incorrect amount, type, or concentration of detergent is added to the wash tub during a wash cycle, excessive bubbles or suds may form. Excessive suds may cause the washing machine appliance to enter a suds lock mode that requires a remediation cycle that adds costly time, water, and energy usage to the wash cycle. Even when remaining bubbles and suds do not result in a suds lock, these suds may remain within the wash tub after a rinse cycle. As a result, a user may have run repeated rinse cycles to remove the excess detergent. Alternatively, the user may remain entirely unaware that excessive suds were present, and if the clothes are not properly rinsed, remaining detergent may result in skin irritation or rashes. Notably, conventional washing machine appliances typically detect the presence of suds in a delayed manner and are therefore delayed in implementing corrective action.

Accordingly, a washing machine appliance with features for improved wash performance would be desirable. More specifically, a system and method for automatically detecting excessive bubbles or suds within the wash chamber and adjusting operation of the washing machine appliance to rectify this condition would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving of a load of clothes, and a camera assembly mounted within the cabinet in view of the wash chamber. A controller is operably coupled to the camera assembly and is configured to obtain one or more images of the wash chamber using the camera assembly, analyze the one or more images using a machine learning image recognition process to determine a level of suds in the wash chamber, determine that the level of suds exceeds a predetermined suds threshold, and adjust at least one operating parameter of the washing machine appliance in response to determining that the level of suds exceeds the suds threshold.

In another exemplary embodiment, a method of operating a washing machine appliance is provided. The washing machine appliance includes a wash basket rotatably mounted within a wash tub and defining a wash chamber configured for receiving of a load of clothes and a camera assembly mounted within the cabinet in view of the wash chamber. The method includes obtaining one or more images of the wash chamber using the camera assembly, analyzing the one or more images using a machine learning image recognition process to determine a level of suds in the wash chamber, determining that the level of suds exceeds a predetermined suds threshold, and adjusting at least one operating parameter of the washing machine appliance in response to determining that the level of suds exceeds the suds threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
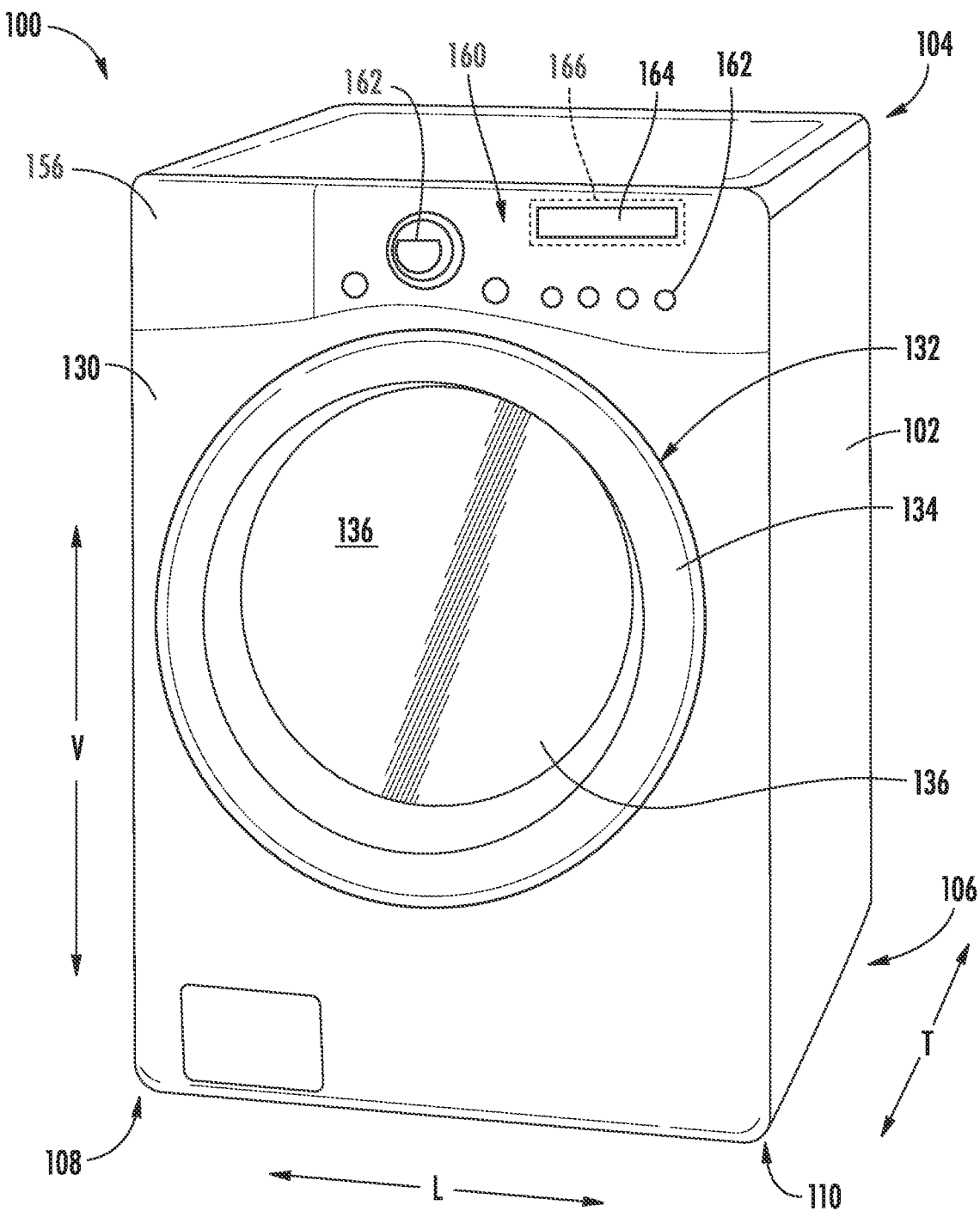
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
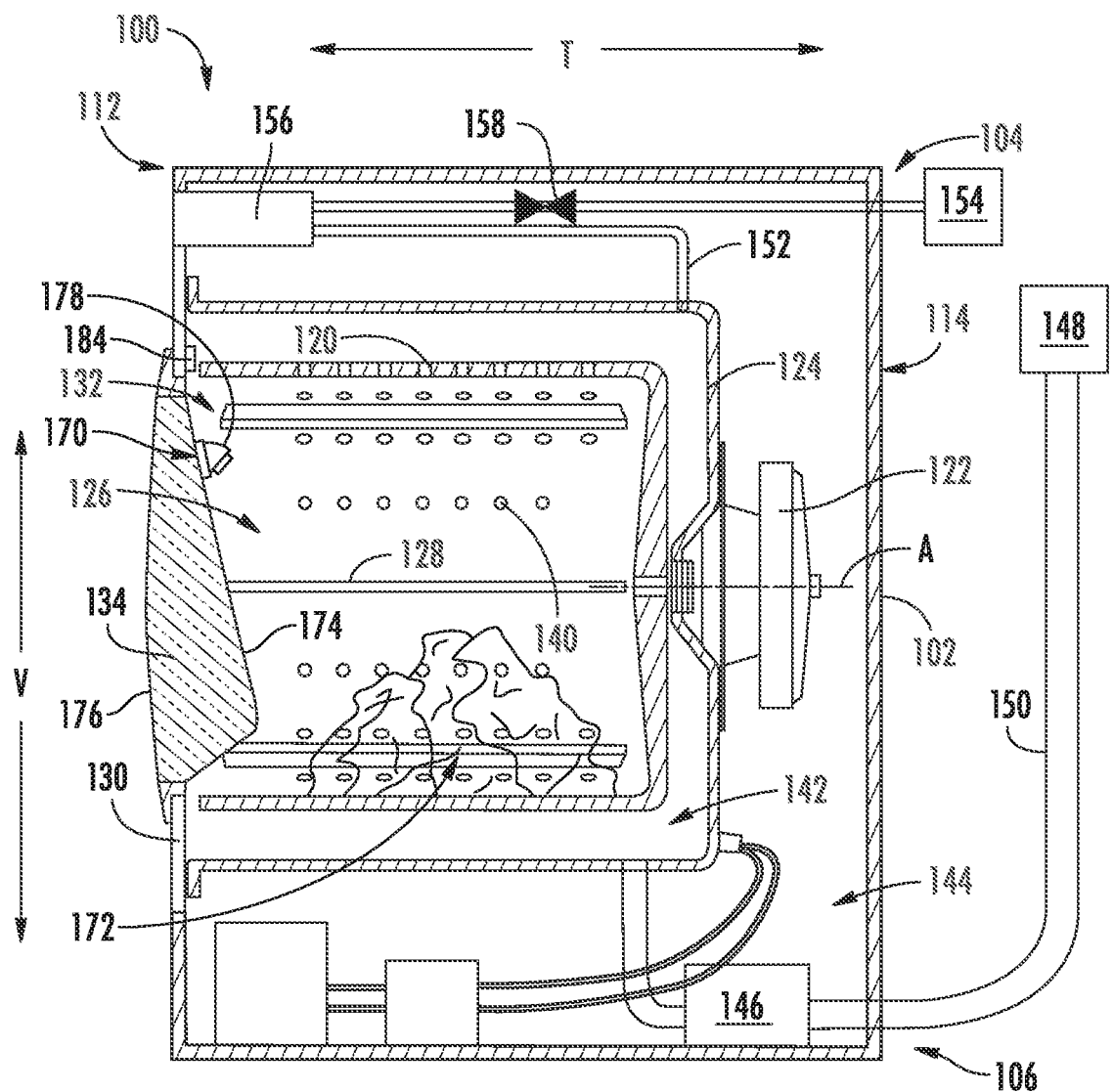
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users. Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 3:
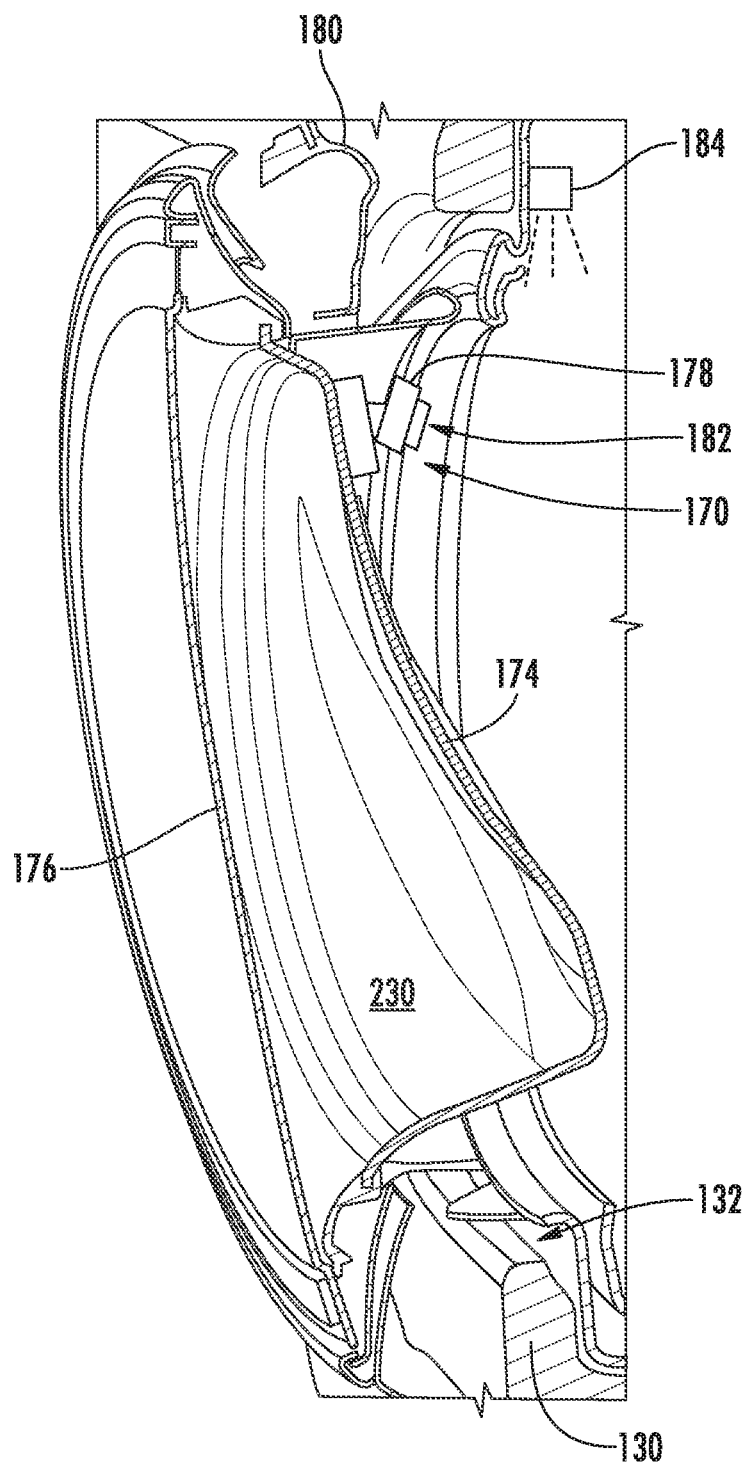
FIG. 3 provides a cross-sectional view of the exemplary washing machine appliance of FIG. 1 with a camera assembly mounted on a door according to an exemplary embodiment of the present subject matter.

Referring now specifically to FIGS. 2 and 3, washing machine appliance 100 may further include a camera assembly 170 that is generally positioned and configured for obtaining images of a load of clothes (e.g., as identified schematically by reference numeral 172) within wash chamber 126 of washing machine appliance 100. Specifically, according to the illustrated embodiment, door 134 of washing machine appliance 100 comprises and inner window 174 that partially defines wash chamber 126 and an outer window 176 that is exposed to the ambient environment. According to the illustrated exemplary embodiment, camera assembly 170 includes a camera 178 that is mounted to inner window 174. Specifically, camera 178 is mounted such that is faces toward a bottom side of wash tub 124. In this manner, camera 178 can take images or video of an inside of wash chamber 126 and remains unobstructed by windows that may obscure or distort such images.

Figure 4:
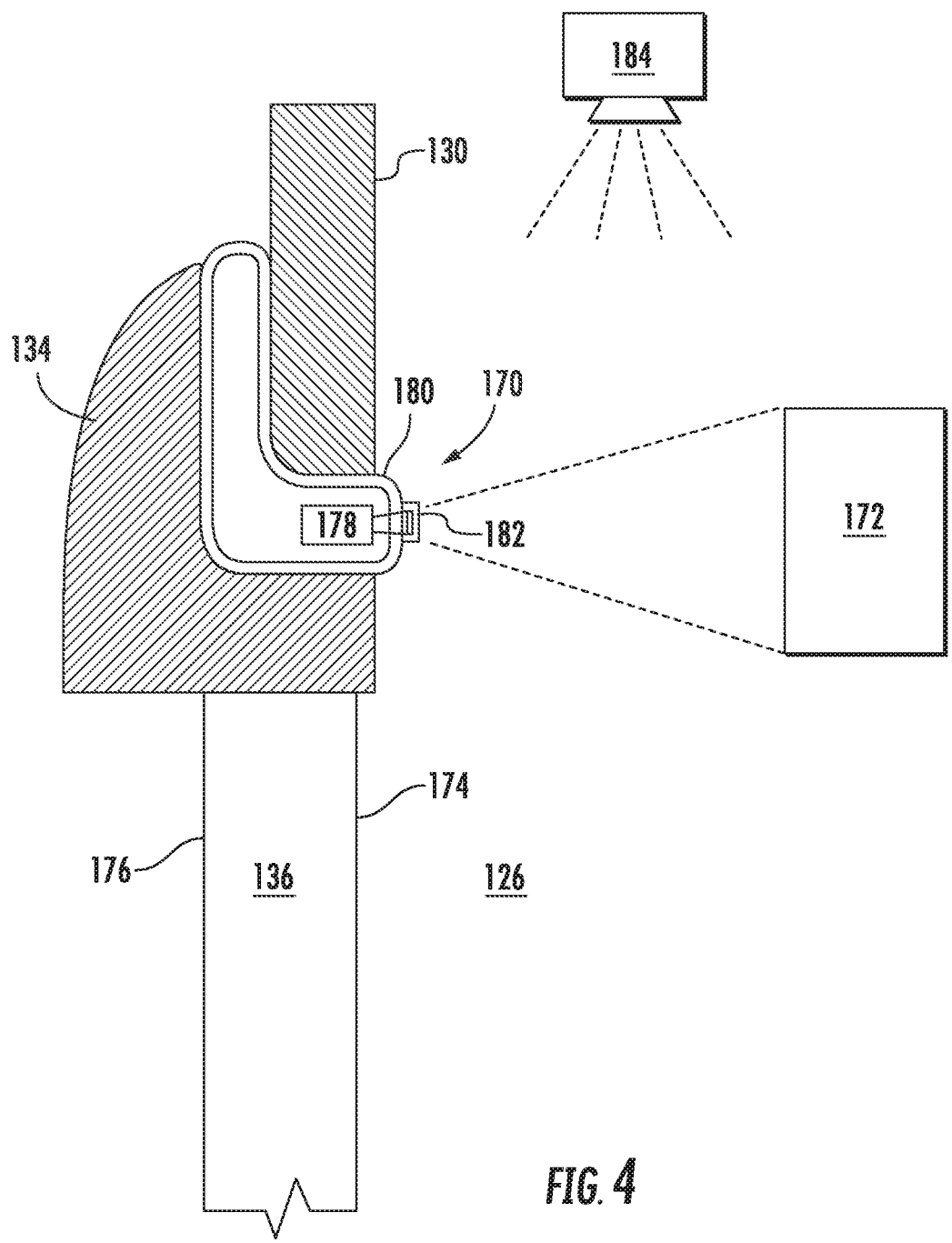
FIG. 4 provides a schematic view of a door and gasket sealed against a cabinet of the exemplary washing machine of FIG. 1, along with a camera mounted within the gasket according to an exemplary embodiment of the present subject matter.

Referring now briefly to FIG. 4, another installation of camera assembly 170 will be described according to an exemplary embodiment of the present subject matter. Due to the similarity between this and other embodiments, like reference numerals may be used to refer to the same or similar features. According to this exemplary embodiment, camera assembly 170 is mounted within a gasket 180 that is positioned between a front panel 130 of cabinet 102 and door 134. Although exemplary camera assemblies 170 are illustrated and described herein, it should be appreciated that according to alternative embodiments, washing machine appliance 100 may include any other camera or system of imaging devices for obtaining images of the load of clothes 172.

It should be appreciated that camera assembly 170 may include any suitable number, type, size, and configuration of camera(s) 178 for obtaining images of wash chamber 126. In general, cameras 178 may include a lens 182 that is constructed from a clear hydrophobic material or which may otherwise be positioned behind a hydrophobic clear lens. So positioned, camera assembly 170 may obtain one or more images or videos of clothes 172 within wash chamber 126, as described in more detail below. Referring still to FIGS. 2 through 4, washing machine appliance 100 may further include a tub light 184 that is positioned within cabinet 102 or wash chamber 126 for selectively illuminating wash chamber 126 and the load of clothes 172 positioned therein.

Notably, controller 166 of washing machine appliance 100 (or any other suitable dedicated controller) may be communicatively coupled to camera assembly 170, tub light 184, and other components of washing machine appliance 100. As explained in more detail below, controller 166 may be programmed or configured for analyzing the images obtained by camera assembly 170, e.g., in order to determine the load characteristics of clothes 172, the level or amount of suds or bubbles within wash chamber 126, or other cycle information, and may use this information to make informed decisions regarding the operation of washing machine appliance 100.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in a combination washer/dryer appliance. Indeed, it should be appreciated that aspects of the present subject matter may further apply to other laundry appliances, such a dryer appliance. In this regard, the same methods as systems and methods as described herein may be used to monitor a load of clothes in a chamber of the dryer.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 5:
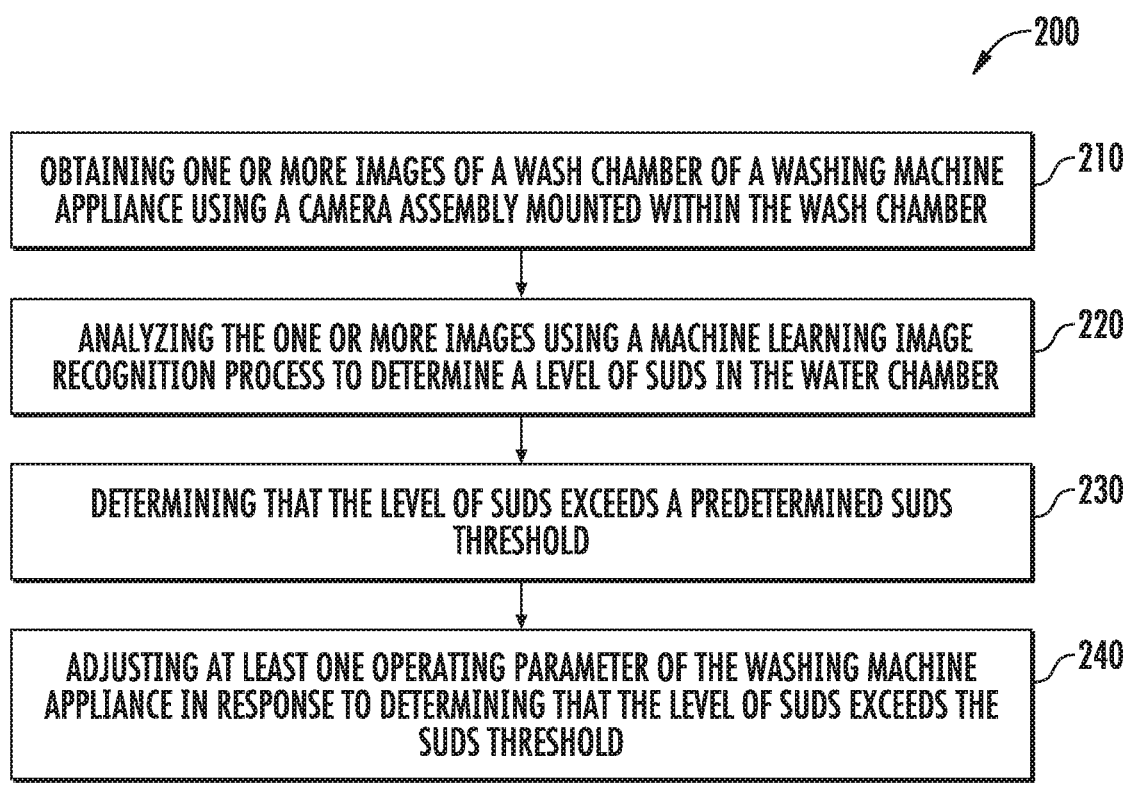
FIG. 5 illustrates a method for operating a washing machine appliance in accordance with one embodiment of the present disclosure.

Referring now to FIG. 5, method 200 includes, at step 210, obtaining one or more images of a load of clothes in a wash chamber of a washing machine appliance using a camera. For example, continuing example from above, camera assembly 170 may obtain a plurality of images of clothes 172 within wash basket 120. It should be appreciated that the images obtained by camera assembly 170 may vary in number, frequency, angle, resolution, detail, etc. For example, aspects of the present subject matter may be performed using a single image. By contrast, aspects of the present subject matter may also be performed using a plurality of images taken from different angles, at different times or frequencies. Moreover, these images may be taken before, during, or after any suitable operating cycle to provide useful information regarding the appliance operation. For example, the one or more images may be taken while the wash basket 120 is stationary or rotating, during or after a wash cycle, during or after a rinse cycle, at multiple times during various during various cycle states, etc. According to an exemplary embodiment, obtaining the one or more images of the load of clothes may include obtaining a first image, tumbling the clothes to achieve a different clothes distribution, and obtaining a second image. In addition, according to exemplary embodiments, controller 166 may be configured for illuminating the tub using tub light 184 just prior to obtaining images.

Step 220 includes analyzing the one or more images using an image recognition process to determine a level of suds in the wash chamber. As used herein, the term "level of suds," "bubble quantity," and the like is intended to refer to any qualitative or quantitative representation of the detergent bubbles within wash chamber 126. For example, the level of suds may refer to a percentage of an area of wash chamber 126 that contains bubbles, a total surface area of the tub that contains bubbles, a percentage of the image capture that includes bubbles, or any other suitable representation of the amount or level of bubbles or suds in wash chamber 126. In addition, it should be appreciated that the level of suds may be an approximation or best fit representation of the amount of bubbles on or around load of clothes 172. For example, controller 166 may be programmed with thresholds for determining whether a suds level qualifies as no suds, low suds, medium suds, etc., or may quantify by percentage of a maximum suds level, e.g., 15% suds, 30% suds, 50% suds, etc.

As used herein, the terms image recognition process, object detection, suds detection, bubble analysis, and similar terms may be used generally to refer to any suitable method of observation, analysis, image decomposition, feature extraction, image classification, etc. of one or more image or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 170 and controller 166 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as suds or bubbles. In this regard, a "region proposal" may be regions in an image that could belong to a particular object, such as suds. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 220 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to obtain load size and suds quantification. In addition, a K-means algorithm may be used. Other image recognition processes are possible and within the scope of the present subject matter.

It should be appreciated that any other suitable image recognition process may be used while remaining within the scope of the present subject matter. For example, step 220 of analyzing the one or more images may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 230 includes determining that the level of suds exceeds a predetermined suds threshold. In this regard, the level or suds determined by image analysis at step 220 may be compared to predetermined and preprogrammed thresholds, e.g., corresponding to suitable and/or unsuitable levels of suds within wash chamber 126 during various operating cycles or at various times. The suds level thresholds may be calculated or determined in any suitable manner. For example, these levels may be set by the user, preprogrammed by the manufacturer, or calculated in real time based on empirical data and known or estimated operating characteristics.

For example, according to exemplary embodiments, the predetermined suds threshold may be a volume or area covered by suds or bubbles. In addition, or alternatively, the predetermined suds threshold may be the percentage of the area of one or more image captures that may be covered or contain suds. In this regard, for example, suds may be quantified in terms of their coverage percentage within one or more images, and the thresholds may be selected at any suitable thresholds, such as 10% or lower being a low suds condition, between 10% and 40% being a medium suds condition, greater than 40% being a high suds condition, etc.

Step 240 includes adjusting at least one operating parameter of the wash machine appliance in response to determining that the level of suds exceeds the suds threshold. As used herein, an "operating parameter" of washing machine appliance 100 is any cycle setting, operating time, component setting, spin speed, part configuration, water level, water temperature, detergent volume, or other operating characteristic that may affect the performance of washing machine appliance 100. Thus, references to operating parameter adjustments or "adjusting at least one operating parameter" are intended to refer to control actions intended to improve system performance based on the suds level. For example, adjusting an operating parameter may include adjusting a water level, e.g., by adding wash fluid or water to wash tub 124. According to exemplary embodiments, the added water may be cold water, which is generally known to be more effective in removing bubbles. In addition, or alternatively, a temperature of the wash fluid may be varied, e.g., by operating supply valve 158 to increase the water temperature. According to still other embodiments, the amount of detergent dispensed in a subsequent operating cycle may be reduced, e.g., to reduce the formation of the excessive suds in a subsequent operating cycle. In addition, according to exemplary embodiments, fabric softener and/or vinegar may be added, e.g., by flushing the softener compartment or by direct user intervention, to reduce suds. Other operating parameter adjustments are possible and within the scope of the present subject matter.

For example, according to an exemplary embodiment, controller 166 may use the mask R-CNN image recognition process on images obtained at step 210 and may determine that the wash chamber 126 contains suds that exceed a threshold level of suds. As a result, controller 166 may further operate supply valve 158 to provide additional water to increase the water level and raise its temperature. Controller 166 may automatically detect whether additional water is needed, may implement and extended or additional rinse cycle, and can take other corrective action to reduce suds, all without requiring user input.

In addition, adjusting the at least one operating parameter may include providing a user notification, e.g., via a user interface or control panel 160, in the event that the suds level exceeds a predetermined threshold. For example, if step 230 results in the determination that the suds exceed the threshold, controller 166 may stop the wash cycle and provide a user notification, e.g., via an indicator on control panel 160 or by communication with a remote device via a wireless communication protocol, such as Wi-Fi or Bluetooth.

Figure 6:
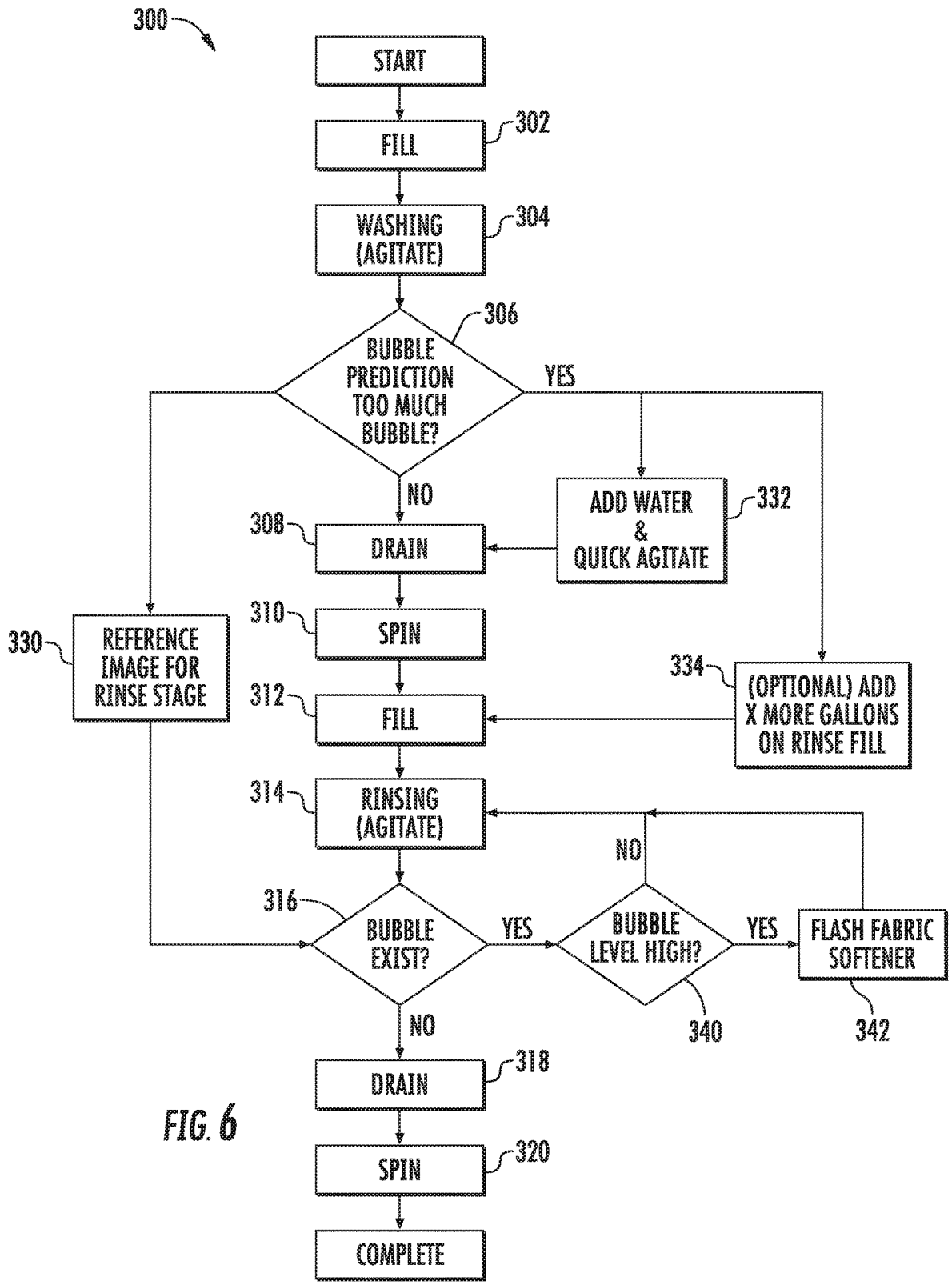
FIG. 6 illustrates a flow diagram for implementation of the exemplary method of FIG. 5 according to an exemplary embodiment of the present subject matter.

Referring now briefly to FIG. 6, one exemplary flow chart (300) illustrating the operation of washing machine appliance 100 while performing method 200 is provided. As illustrated, the washing machine appliance 100 may start operation by performing a wash cycle, including a fill cycle (302) where wash fluid is supplied into the wash chamber and the wash basket spins to agitate (304) the clothes and facilitate cleansing. At step (306) a bubble prediction process may be performed, whereby method 200 is at least partially performed, e.g., such that the camera obtains one or more images that are analyzed using techniques described herein. This early information may inform the learning algorithm as to the current and anticipated number of bubbles, e.g., such as an anticipated amount of foam present after rinse.

This process (300) may continue through a drain cycle (308) and a spin cycle (310), where the wash basket is rotated at high speeds while the drain pump discharges wash fluid from the sump. After the wash tub is drained, a rinse process may begin. Specifically, the wash tub may be filled with water (312) and a rinse process (314) may be performed, e.g., by rotating wash basket and agitating clothes to extract any excess detergent. Step (316) may include another implementation of method 200, specifically, where images are obtained and analyzed to obtain a quantitative or qualitative representation of suds within the wash chamber. If the level of suds exceeds a predetermined threshold, corrective action may be implemented, e.g., to reduce the level of suds before the operating cycle is completed. In this regard, if excessive bubbles are not detected during the rinse cycle, the drain pump may be operated (318) and the wash basket may spin (320) to remove any excess water before terminating the cycle.

According to exemplary embodiments of the present subject matter, method 300 may further include a bubble prediction process. In this regard, for example, at step 330, a reference image of the wash chamber is taken using the camera assembly. This reference image may be the same image taken at step 306 for bubble prediction or may be a separate, additional image. This image may be used to facilitate the bubble prediction process at the rinse stage. Specifically, the prediction process may include performing an image recognition process (e.g., such as a CNN bubble detection process) on the reference image taken at step 330 (referred to herein as the "reference image") and/or may include capturing the reference image for use at the rinse stage to improve bubble detection at that stage (e.g., using R-CNN). In this regard, the reference image taken at 330 may improve the accuracy of information obtained at the rinse stage (e.g., at step 316).

In general, the bubble prediction process includes capturing an image when washing, e.g., after filling with water and detergent (step 302) and agitating (step 304). This image may be referred to herein as the reference image and may be used to perform immediate remedial action (e.g., at steps 332 and 334) and/or be passed forward for use during the rinse bubble detection process (e.g., at step 316). According to an exemplary embodiment, CNN is used for bubble detection at step 306, while reference image may be used in an R-CNN process at the rinse stage.

Referring again to step 306, if excessive bubbles are detected, instead of going through a drain cycle (e.g., starting at step 308), method 300 may implement corrective action. Specifically, for example, at step 332, method 300 may include adding a predetermined amount of water and performing a quick agitation cycle. This added water may dilute the concentration of detergent for better rinse performance with fewer suds. In addition, or alternatively, step 334 may include adding more water during the rinse cycle.

Specifically, if excessive suds are detected at step 306, step 334 is an optional step that may add an additional predetermined amount of gallons than would otherwise be added at rinse fill (e.g., at step 312). Notably, adding water while rinsing may save consumer cycle time by diluting the concentration of detergent or otherwise improving rinse performance.

Referring again to step 316, as noted before, if no bubbles are detected, method 300 may include draining (step 318), spinning (step 320), and completing/ending the cycle. By contrast, if bubbles are detected at step 316, step 340 may include determining whether the bubble level is high, e.g., whether the amount of bubbles exceed a predetermined threshold. If there are bubbles, but the bubbles are relatively minor or not considered a "high" bubble level, method 300 may return to step 314 to perform another agitation cycle. By contrast, if the bubble level is determined to be high at step 340, method 300 may further include adding fabric softener at step 342. Specifically, step 342 may include flushing the fabric softener compartment of the detergent dispenser or otherwise adding fabric softener (e.g., via user intervention). According to still other exemplary embodiments, step 342 may include flushing or adding vinegar or any other suitable additive to help reduce the suds level. In addition, this step may include providing a user notification that these additives are needed, e.g., via display 164 or via a remote device.

FIGS. 5 and 6 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that these methods may be applied to the operation of any suitable washing machine appliance.

The systems and methods described herein provide a manner of determining a bubbles (foam) condition inside a washing drum of a washing appliance by sending image(s) captured during rinse cycle to a learning algorithm. The method as disclosed may predict a bubble amount (foam) during washing and this prediction may be used as reference for a bubble detection model. A bubble detection cycle may be initiated during rinsing by capturing image(s) by an image sensor (camera) placed inside the washing drum and sending it to the bubble detection model. The images captured may be focused at locations inside the washing drum. The bubble detection model may use a machine learning algorithm to detect excessive bubbles (foam) to further add more water or to increase the number of rinse cycles (or to adjust the water temperature) during the rinse cycle. The method helps to prevent suds lock condition caused by excessive amount of foam.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
a wash tub positioned within a cabinet;
a wash basket rotatably mounted within the wash tub and defining a wash chamber configured for receiving of a load of clothes;
a camera assembly mounted within the cabinet in view of the wash chamber; and
a controller operably coupled to the camera assembly, the controller being configured to:
obtain a reference image prior to draining the wash tub after a wash cycle using the camera assembly;
analyze the reference image using a machine learning image recognition process to determine a pre-drain level of suds in the wash chamber;
determine that the pre-drain level of suds exceeds a pre-drain suds threshold;
add water and perform a preliminary agitation cycle in response to determining that the pre-drain level of suds exceeds the pre-drain suds threshold;
perform a drain cycle and a rinse cycle;
obtain one or more images of the wash chamber using the camera assembly;
analyze the one or more images using a machine learning image recognition process and the reference image to determine a level of suds in the wash chamber;
determine that the level of suds exceeds a predetermined suds threshold; and
adjust at least one operating parameter of the washing machine appliance in response to determining that the level of suds exceeds the suds threshold.

2. The washing machine appliance of claim 1, wherein obtaining the one or more images of the load of clothes comprises:
obtaining at least one image during a wash cycle while the wash basket is rotating.

3. The washing machine appliance of claim 1, wherein obtaining the one or more images of the load of clothes comprises:
obtaining at least one image during the rinse cycle as the wash basket rotates.

4. The washing machine appliance of claim 1, wherein obtaining the one or more images of the load of clothes comprises:
obtaining at least one image after the rinse cycle.

5. The washing machine appliance of claim 1, wherein obtaining the one or more images of the load of clothes comprises:
obtaining a first image;
rotating the wash basket to tumble the load of clothes; and
obtaining a second image.

6. The washing machine appliance of claim 1, further comprising:
a tub light for illuminating the wash chamber, wherein the controller is further configured to turn on the tub light prior to obtaining the one or more images of the wash chamber.

7. The washing machine appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

8. The washing machine appliance of claim 1, wherein the washing machine appliance further comprises:

a supply valve for providing the wash fluid into the wash tub, and wherein adjusting the at least one operating parameter comprises adding water to the wash tub.

9. The washing machine appliance of claim 1, wherein the washing machine appliance further comprises:
a supply valve for providing the wash fluid into the wash tub, and wherein adjusting the at least one operating parameter comprises decreasing a water temperature of the water added to the wash tub.

10. The washing machine appliance of claim 1, wherein the washing machine appliance further comprises:
a detergent dispenser for providing the detergent into the wash tub, and wherein adjusting the at least one operating parameter comprises reducing an amount of dispensed detergent during a subsequent wash cycle.

11. The washing machine appliance of claim 1, wherein the washing machine appliance further comprises:
a detergent dispenser for providing the detergent into the wash tub, and wherein adjusting the at least one operating parameter comprises adding fabric softener to the wash tub.

12. The washing machine appliance of claim 1, wherein the washing machine appliance further comprises:
a user interface panel, wherein the controller is further configured to provide a user notification when the suds level exceeds the suds threshold.

13. The washing machine appliance of claim 1, further comprising:
a door rotatably mounted to the cabinet for providing selective access to the wash chamber; and
a gasket positioned between wherein the door and the cabinet, wherein the camera assembly is mounted in the gasket.

14. The washing machine appliance of claim 1, further comprising:
a door rotatably mounted to the cabinet for providing selective access to the wash chamber, wherein the camera assembly is mounted on an inner surface of the door.

15. A method of operating a washing machine appliance, the washing machine appliance comprising a wash basket rotatably mounted within a wash tub and defining a wash chamber configured for receiving of a load of clothes, and a camera assembly mounted within the cabinet in view of the wash chamber, the method comprising:
obtaining a reference image prior to draining the wash tub after a wash cycle using the camera assembly;
analyzing the reference image using a machine learning image recognition process to determine a pre-drain level of suds in the wash chamber;
determining that the pre-drain level of suds exceeds a pre-drain suds threshold;
adding water and performing a preliminary agitation cycle in response to determining that the pre-drain level of suds exceeds the pre-drain suds threshold;
performing a drain cycle and a rinse cycle;
obtaining one or more images of the wash chamber using the camera assembly;
analyzing the one or more images using a machine learning image recognition process and the reference image to determine a level of suds in the wash chamber;
determining that the level of suds exceeds a predetermined suds threshold; and
adjusting at least one operating parameter of the washing machine appliance in response to determining that the level of suds exceeds the suds threshold.

16. The method of claim 15, wherein obtaining the one or more images of the load of clothes comprises:
obtaining at least one image while the wash basket is rotating.

17. The method of claim 15, wherein the machine learning image recognition process comprises at least one a convolution neural network ("CNN"), a region-based convolution neural network ("R-CNN"), a deep belief network ("DBN"), or a deep neural network ("DNN") image recognition process.

18. The method of claim 15, wherein adjusting the at least one operating parameter comprises operating a supply valve to add water to the wash tub or decrease a water temperature of the water added to the wash tub.

19. The method of claim 15, wherein adjusting the at least one operating parameter comprises operating a detergent dispenser to reduce an amount of dispensed detergent during a subsequent wash cycle or adding fabric softener to the wash tub.

* * * * *